US011550676B2

(12) United States Patent
Sorenson et al.

(10) Patent No.: US 11,550,676 B2
(45) Date of Patent: *Jan. 10, 2023

(54) HARDWARE-MANAGEMENT-CONSOLE-INITIATED DATA PROTECTION

(71) Applicant: International Business Machines Corporation, Armonk, NY (US)

(72) Inventors: Todd C. Sorenson, Tucson, AZ (US); Ronald D. Martens, Benson, AZ (US); Keith G. Morrison, Saratoga, CA (US); Brian A. Rinaldi, Tucson, AZ (US); Jiwu Duan, Tucson, AZ (US); John C. Elliott, Tucson, AZ (US); Gary W. Batchelor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 16/124,101

(22) Filed: Sep. 6, 2018

(65) Prior Publication Data

US 2020/0081809 A1 Mar. 12, 2020

(51) Int. Cl.
*G06F 11/20* (2006.01)
*G06F 1/30* (2006.01)
(Continued)

(52) U.S. Cl.
CPC ............ *G06F 11/2092* (2013.01); *G06F 1/30* (2013.01); *G06F 11/0778* (2013.01);
(Continued)

(58) Field of Classification Search
CPC ............ G06F 11/2092; G06F 11/0778; G06F 11/1441; G06F 11/201; G06F 11/2015;
(Continued)

(56) References Cited

U.S. PATENT DOCUMENTS 5,978,236 A * 11/1999 Faberman ............... H02J 9/061
363/37
6,274,950 B1 * 8/2001 Gottlieb ............... H02J 7/0021
307/66

(Continued)

OTHER PUBLICATIONS

Rose, M; K. McCloghrie. Structure and Identification of Management Information for TCP/IP-based internets, Network Working Group Request for Comments: 1065 (Aug. 1988) (Year: 1988).*

(Continued)

*Primary Examiner* — Matthew M Kim
*Assistant Examiner* — Matthew N Putaraksa
(74) *Attorney, Agent, or Firm* — Nelson IP; Daniel P. Nelson

(57) ABSTRACT

A method for protecting data in a storage system is disclosed. In one embodiment, such a method includes detecting, by a first hardware management console, first battery-on status associated with a first uninterruptible power supply. The method further detects, by a second hardware management console, second battery-on status associated with a second uninterruptible power supply. The method communicates, from the first hardware management console to the second hardware management console, the first battery-on status. The method then triggers, by the second hardware management console, a dump of modified data from memory to more persistent storage upon detecting both the first battery-on status and the second battery-on status. A corresponding system and computer program product are also disclosed.

20 Claims, 9 Drawing Sheets

(51) Int. Cl.
  *G06F 11/07* (2006.01)
  *G06F 11/30* (2006.01)
  *H04L 67/1097* (2022.01)
  *G06F 11/14* (2006.01)
(52) U.S. Cl.
  CPC ........ *G06F 11/1441* (2013.01); *G06F 11/201* (2013.01); *G06F 11/2015* (2013.01); *G06F 11/2094* (2013.01); *G06F 11/3055* (2013.01); *H04L 67/1097* (2013.01)
(58) Field of Classification Search
  CPC ............. G06F 11/2094; G06F 11/3055; G06F 11/2089; G06F 1/30; G06F 1/26; G06F 1/28; H04L 67/1097; H04L 67/568; H04L 41/0213
  USPC .......................................................... 714/14
  See application file for complete search history.

(56) References Cited

U.S. PATENT DOCUMENTS

| | | | | |
|---|---|---|---|---|
| 6,298,449 | B1* | 10/2001 | Carter | G06F 1/30 713/340 |
| 7,085,886 | B2* | 8/2006 | Hsu | G06F 11/1441 711/120 |
| 8,476,787 | B2* | 7/2013 | Spitaels | H02J 3/144 307/64 |
| 9,098,278 | B1* | 8/2015 | Nay | G06F 1/30 |
| 9,158,700 | B2 | 10/2015 | Goss et al. | |
| 2002/0138785 | A1* | 9/2002 | Hammond | H02J 9/00 714/14 |
| 2004/0117533 | A1* | 6/2004 | Fallon | G06F 1/30 710/260 |
| 2005/0132150 | A1* | 6/2005 | Jewell | G06F 11/1441 713/340 |
| 2006/0143583 | A1* | 6/2006 | Diab | G06F 1/3209 713/300 |
| 2011/0068630 | A1* | 3/2011 | Okada | H02J 13/00017 307/66 |
| 2014/0232333 | A1 | 8/2014 | Kim et al. | |
| 2017/0091042 | A1 | 3/2017 | Chou et al. | |
| 2018/0011524 | A1 | 1/2018 | Stumpf et al. | |
| 2018/0024768 | A1 | 1/2018 | Nguyen et al. | |
| 2019/0204887 | A1* | 7/2019 | Yan | G06F 1/263 |
| 2019/0235599 | A1 | 8/2019 | Yuasa | |
| 2020/0379548 | A1* | 12/2020 | Dupree | G06F 1/266 |

OTHER PUBLICATIONS https://www.ibm.com/support/pages/connecting-uninterrupted-power-supply-ups-power8-servers-using-usb-20 (Year: 2018).*
SolarCraft (Year: 2021).*
Uniterruptible power supply—IBM (Year: 2021).*
990-6447B-EN (Year: 2021).*
990-91377A_Technical Specifications (Year: 2021).*
Modbus Register Map_Galaxy VL (Year: 2021).*
List of IBM Patents or Patent Applications Treated as Related.

* cited by examiner

HARDWARE-MANAGEMENT-CONSOLE-INITIATED DATA PROTECTION

BACKGROUND

Field of the Invention

This invention relates to systems and methods for protecting data in multi-server storage systems.

Background of the Invention

In an enterprise storage system such as the IBM DS8000™ enterprise storage system, a pair of servers may be used to access data in one or more storage drives (e.g., hard-disk drives and/or solid-state drives). During normal operation (when both servers are operational), the servers may manage I/O to different logical subsystems (LSSs) within the enterprise storage system. For example, in certain configurations, a first server may handle I/O to even LSSs, while a second server may handle I/O to odd LSSs. These servers may provide redundancy and ensure that data is always available to connected hosts. When one server fails, the other server may pick up the I/O load of the failed server to ensure that I/O is able to continue between the hosts and the storage drives. This process may be referred to as a "failover."

Each server in the storage system may include one or more processors and memory. The memory may include volatile memory (e.g., RAM) as well as non-volatile memory (e.g., ROM, EPROM, EEPROM, flash memory, local hard drives, local solid state drives, etc.). The memory may include a cache, such as a DRAM cache. Whenever a host (e.g., an open system or mainframe server) performs a read operation, the server that performs the read may fetch data from the storage drives and save it to its cache in the event it is required again. If the data is requested again by a host, the server may fetch the data from the cache instead of fetching it from the storage drives, saving both time and resources. Similarly, when a host performs a write, the server that receives the write request may store the modified data in its cache, and destage the modified data to the storage drives at a later time. When modified data is stored in cache, the modified data may also be stored in non-volatile storage (NVS) of the opposite server so that the modified data can be recovered by the opposite server in the event the first server fails. In certain embodiments, the NVS is implemented as battery-backed volatile memory in the opposite server.

When a storage system such as the IBM DS8000™ enterprise storage system experiences a power outage, the modified data in the NVS may be quickly copied using battery power to more persistent storage on the server (e.g., a local disk drive, solid state drive, and/or flash drive on the server). The energy in the backup battery needs to be sufficient to complete the copy process. If a battery is degraded or the copy process is not initiated quickly enough after the storage system goes on battery power, the battery may not have sufficient energy to complete the copy process. In such cases, data loss may result.

In view of the foregoing, what are needed are systems and methods to ensure that modified data in an NVS is not lost in the event of a power outage. Further needed are systems and methods to ensure that, in the event of a power outage, data is promptly and reliably copied from the NVS to more persistent storage.

SUMMARY

The invention has been developed in response to the present state of the art and, in particular, in response to the problems and needs in the art that have not yet been fully solved by currently available systems and methods. Accordingly, systems and methods have been developed to more effectively protect modified data in a storage system. The features and advantages of the invention will become more fully apparent from the following description and appended claims, or may be learned by practice of the invention as set forth hereinafter.

Consistent with the foregoing, a method for protecting data in a storage system is disclosed. In one embodiment, such a method includes detecting, by a first hardware management console, first battery-on status associated with a first uninterruptible power supply. The method further detects, by a second hardware management console, second battery-on status associated with a second uninterruptible power supply. The method communicates, from the first hardware management console to the second hardware management console, the first battery-on status. The method then triggers, by the second hardware management console, a dump of modified data from memory to more persistent storage upon detecting both the first battery-on status and the second battery-on status.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
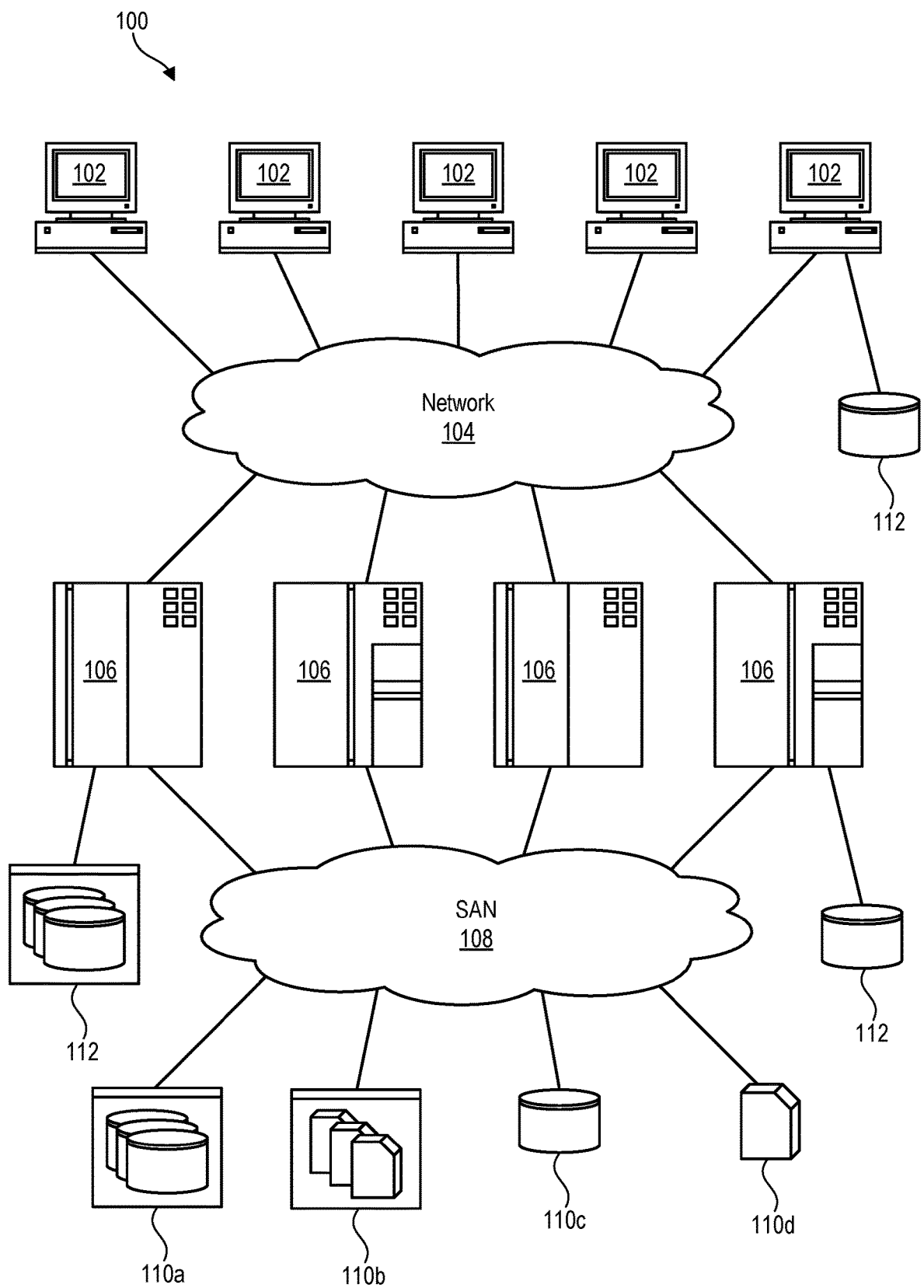
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
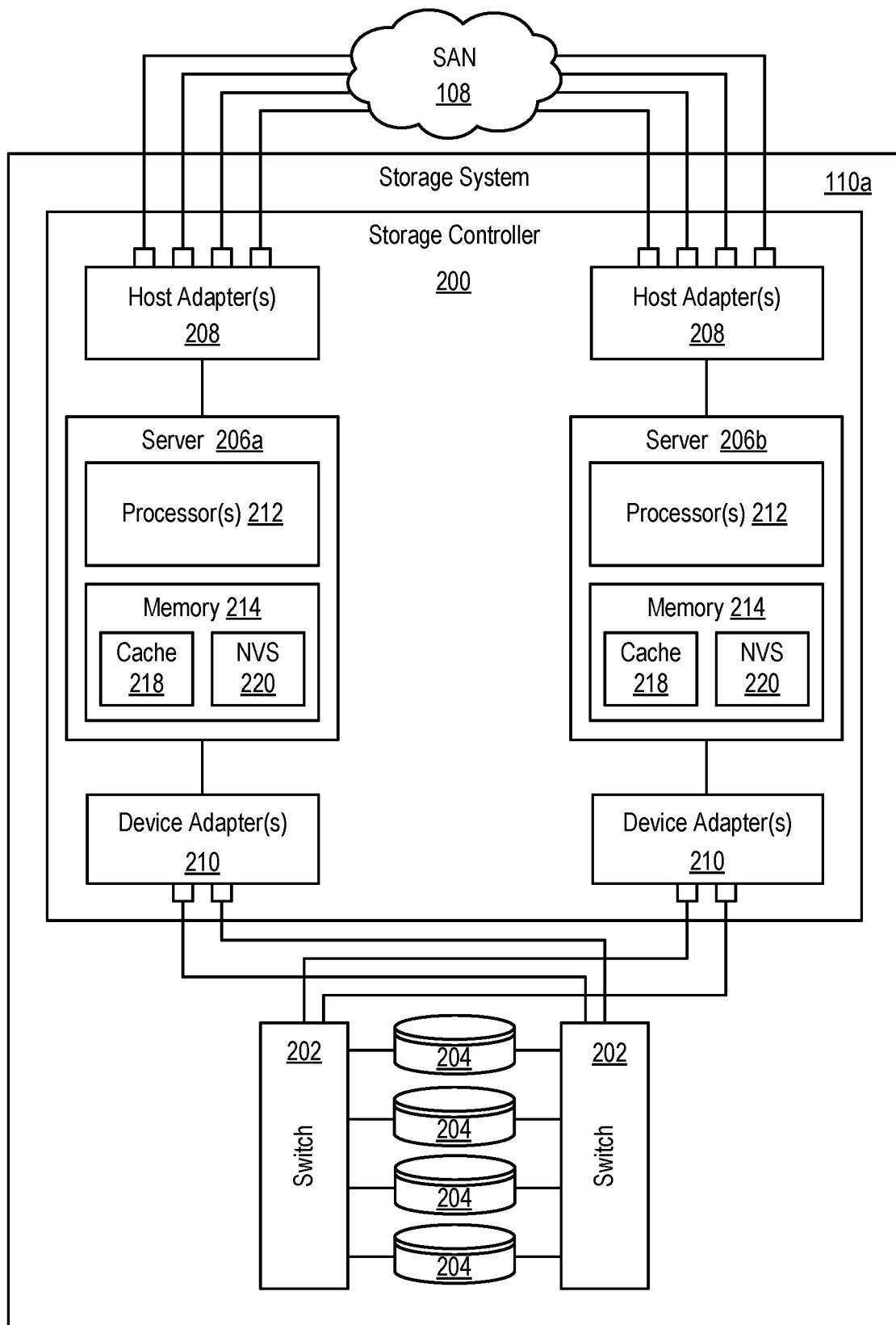
FIG. 2 is a high-level block diagram showing one example of a storage system for use in the network environment of FIG. 1.

Referring to FIG. 2, one embodiment of a storage system 110a containing an array of storage drives 204 (e.g., hard-disk drives and/or solid-state drives) is illustrated. The internal components of the storage system 110a are shown since the systems and methods disclosed herein may, in certain embodiments, be implemented within such a storage system 110a, although the systems and methods may also be applicable to other storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110a. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed volatile memory in the opposite server 206.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
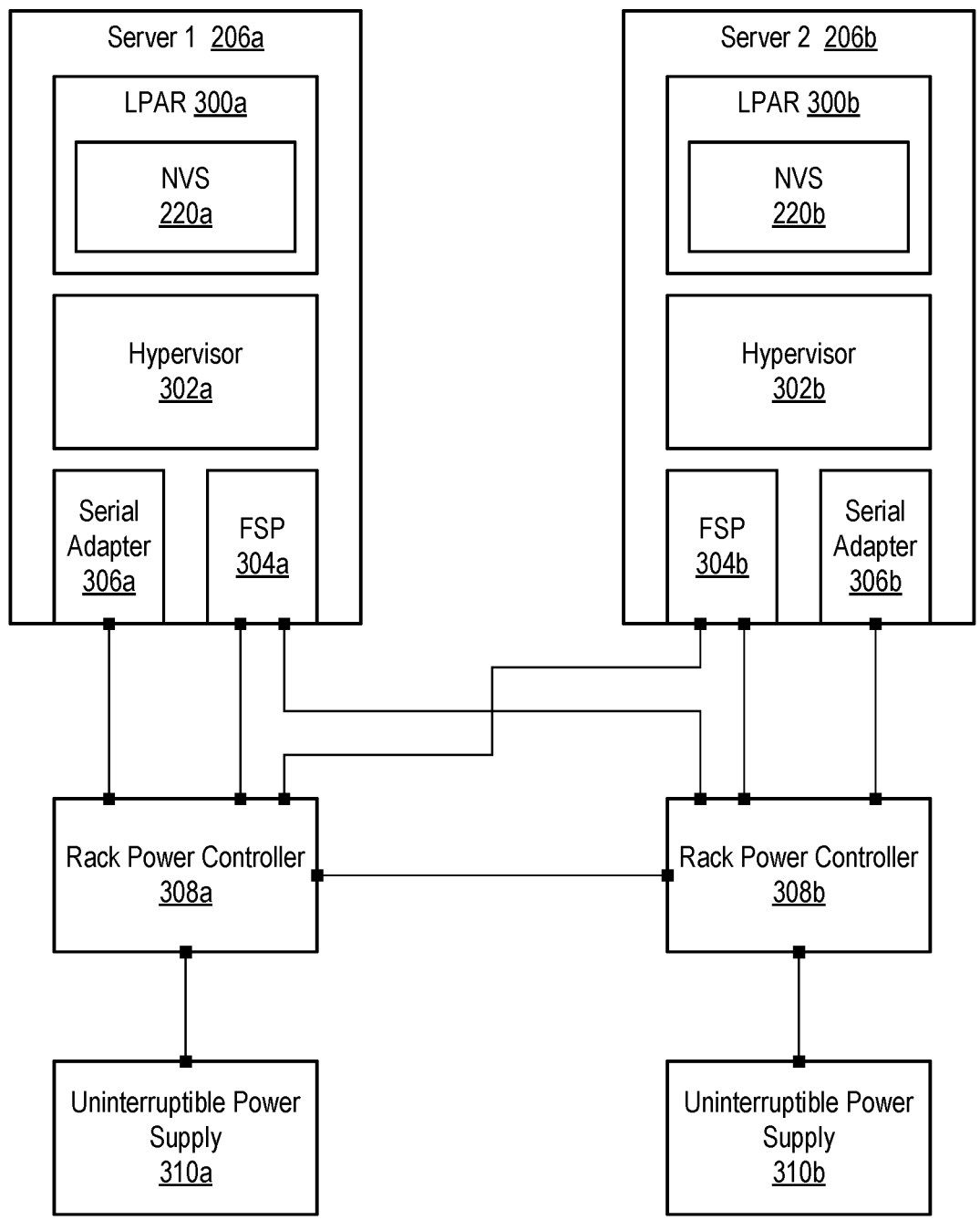
FIG. 3 is a high-level block diagram showing various components tasked with supplying power to a storage system such as that illustrated in FIG. 2.

Referring to FIG. 3, when a storage system 110a such as that illustrated in FIG. 2 experiences a power outage, the modified data in the NVS 220 may be quickly copied (also referred to as performing a "fire hose dump") under battery power to more persistent storage (a local disk drive, solid state drive, flash drive, etc. in the server 206). Ideally, this copy process will complete before energy in the battery is depleted. It follows that the energy in the battery needs to be sufficient to complete the copy process. If a battery is degraded or the copy process is not initiated quickly enough after the storage system goes on battery power, the battery may not have sufficient energy to complete the copy process. In such cases, data loss may result. In such cases, modified data in the NVS 220 may be all or partially lost.

FIG. 3 is a high-level block diagram showing various components that may be associated with supplying power to a storage system 110a such as that illustrated in FIG. 2. As shown, the storage system 110a includes a pair of servers 206a, 206b. Each server 206 may host one or more logical partitions 300, each of which may have non-volatile storage (NVS) 220 associated therewith to store modified data. Each server 206 may include a hypervisor 302 to provide isolation between the logical partitions 300. The hypervisors 302 may coordinate and manage system virtualization, including creating logical partitions 300 and dynamically moving resources across different operating environments.

As further shown in FIG. 3, the storage system 110a may include rack power controllers 308. These rack power controllers 308 may manage power distribution and efficiency within the storage system 110a. As further shown in FIG. 3, each rack power controller 308 may be coupled to an uninterruptible power supply 310 that provides power to the storage system 110a. The uninterruptible power supplies 310 may include a backup battery to supply power to the storage system 110a when external power is interrupted. This may enable data to be copied from the non-volatile storage 220 to more persistent storage before energy in the battery is depleted.

As shown in FIG. 3, the uninterruptible power supplies 310 may supply power to the storage system 110a. Each uninterruptible power supply 310 may supply power (either external power or battery power) to both servers 206 in the storage system 110a. This provides redundancy to ensure that, if an uninterruptible power supply 310 fails, the remaining uninterruptible power supply 310 will still be available to supply power to the servers 206.

In certain embodiments in accordance with the invention, a dump of modified data (i.e., a "fire hose dump") may only be initiated when both uninterruptible power supplies 310 have experienced external power loss and are operating "on battery." This fire hose dump may be initiated by either rack power controller 308 when the rack power controller 308 becomes aware that both uninterruptible power supplies 310 are on battery. Systems and methods in accordance with the invention may ensure that both rack power controllers 308 are aware when one or both uninterruptible power supplies 310 are on battery, even with off-the-shelf uninterruptible power supplies 310 that have a single "on battery" communication line and can only connect to a single rack power controller 308.

Figure 4:
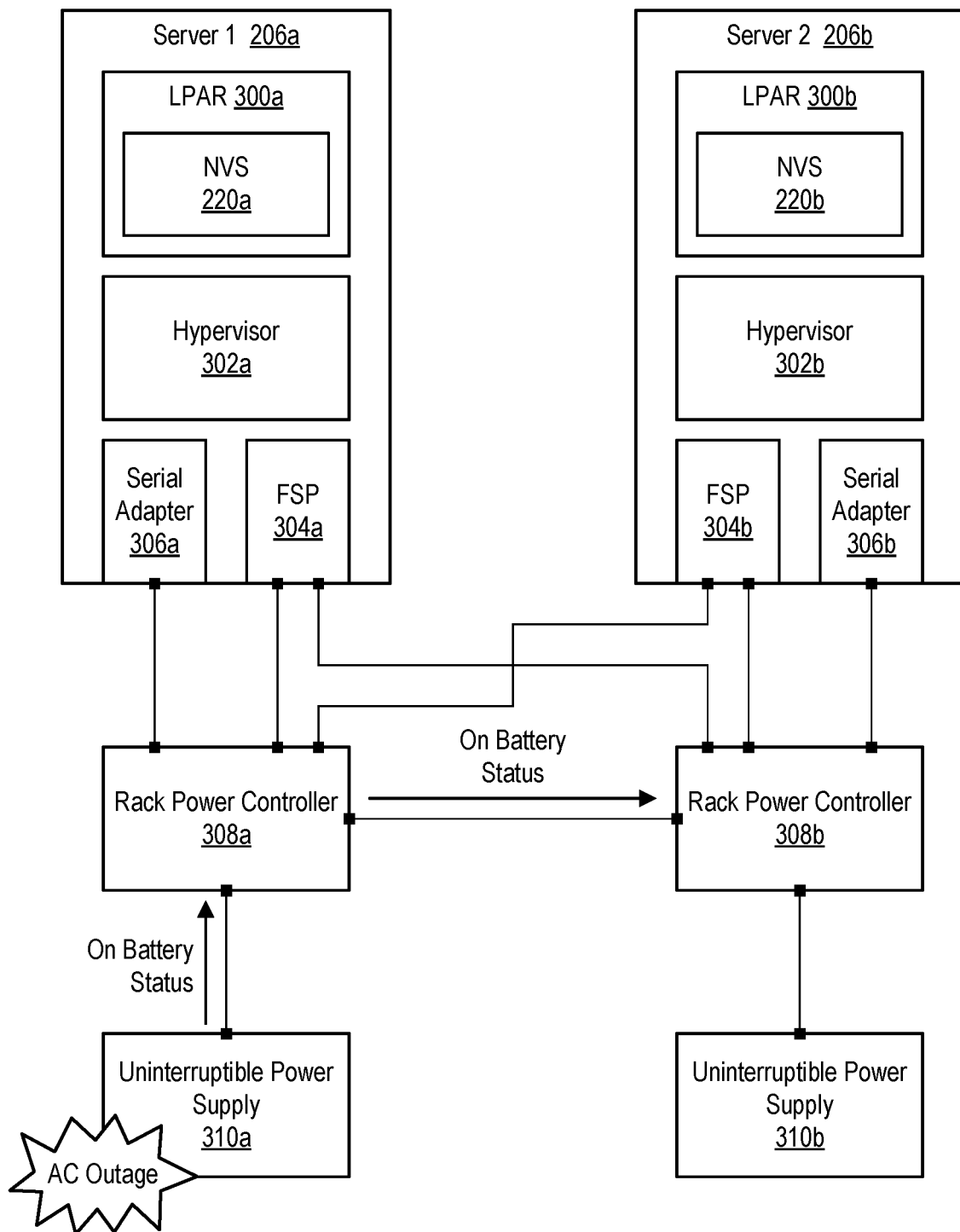
FIG. 4 is a high-level block diagram showing the system of FIG. 3 when a single uninterruptible power supply goes on battery.

In certain embodiments in accordance with the invention, rack power controllers 308 may be configured to communicate the battery status of their respective uninterruptible power supplies 310 with each other. For example, as shown in FIG. 4, if a first rack power controller 308a detects that its uninterruptible power supply 310 has experienced a power outage and is on battery, the first rack power controller 308a may communicate this status to a second rack power controller 308b. If the second rack power controller 308b does not detect a corresponding power outage and on-battery status for its uninterruptible power supply 310b, the second rack power controller 308b may take no action. That is, the second rack power controller 308 may make no attempt to initiate a fire hose dump on the first and second servers 206a, 206b.

Figure 5:
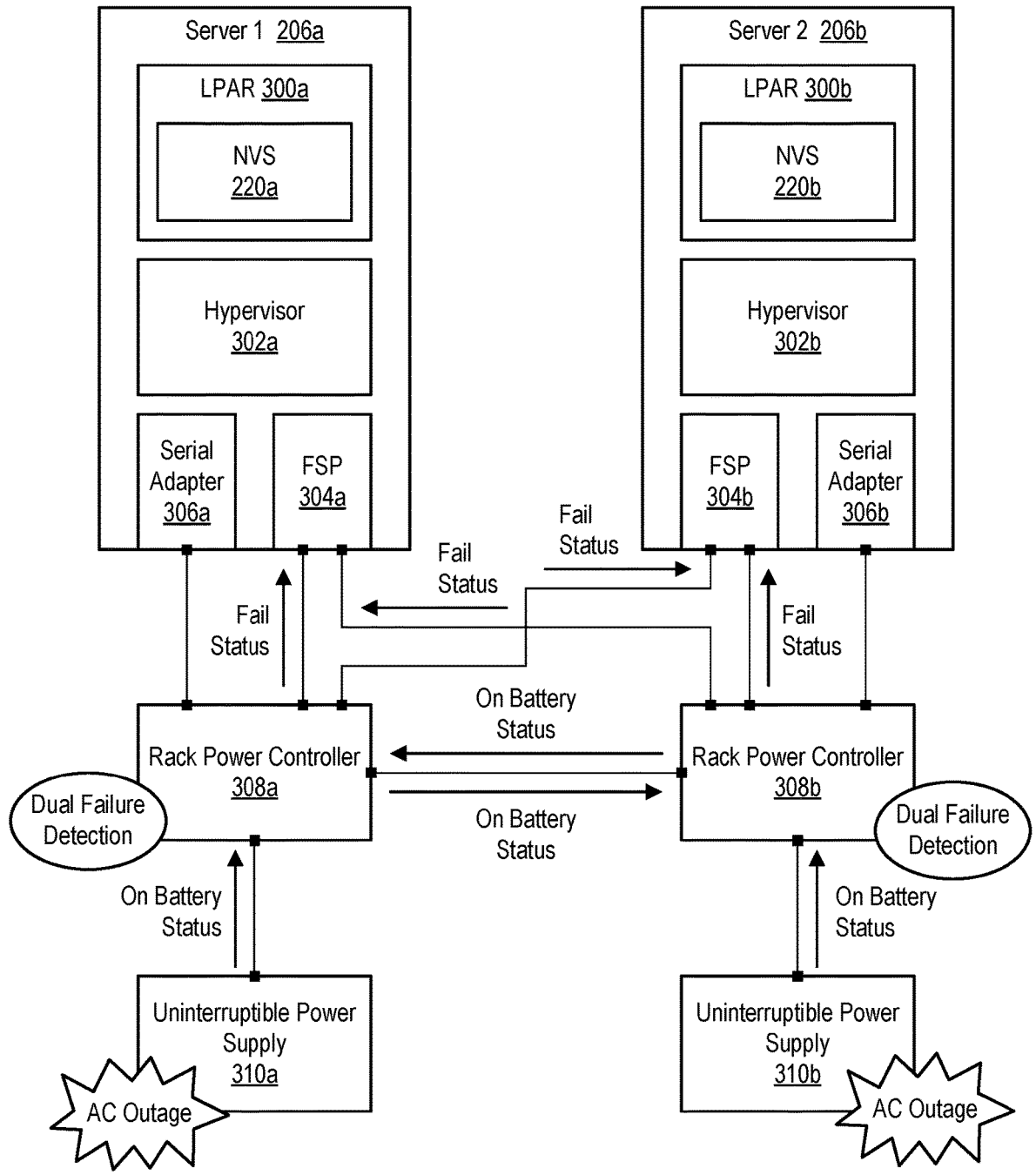
FIG. 5 is a high-level block diagram showing the system of FIG. 3 when both uninterruptible power supplies go on battery.

On the other hand, if the second rack power controller 308b detects that its uninterruptible power supply 310b has also experienced a power outage and is on battery, as shown in FIG. 5, the second rack power controller 308b may be aware that both uninterruptible power supplies 310 are on battery. In such a scenario, the second rack power controller 308b may communicate failure status to each server 206. This failure status may trigger a fire hose dump on both servers 206.

Similarly, for redundancy purposes, the second rack power controller 308b may, upon detecting that its uninterruptible power supply 310b is on battery, send on-battery status to the first rack power controller 308a. The first rack power controller 308a, now being aware that both uninterruptible power supplies 310 are on battery, may send failure status to both servers 206, thereby initiating a fire hose dump on both servers 206 if the fire hose dump has not already been initiated. Thus, when both uninterruptible power supplies 310 experience a power outage and are on battery, both rack power controllers 308 may detect the on-battery status of both uninterruptible power supplies 310. In response, each rack power controller 308 may independently initiate fire hose dumps on both servers 206.

In certain embodiments, when a server 206 receives failure status from a rack power controller 308, a flexible service processor (FSB) 304 within the server 206 may receive this failure status and pass the status to the server's hypervisor 302. In response to receiving this failure status, the hypervisor 302 may initiate the fire hose dump within each logical partition 300 of the server 206. Alternatively, or additionally, failure status may be communicated through a serial adapter 306 on each server 206 to initiate the fire hose dump.

Figure 6:
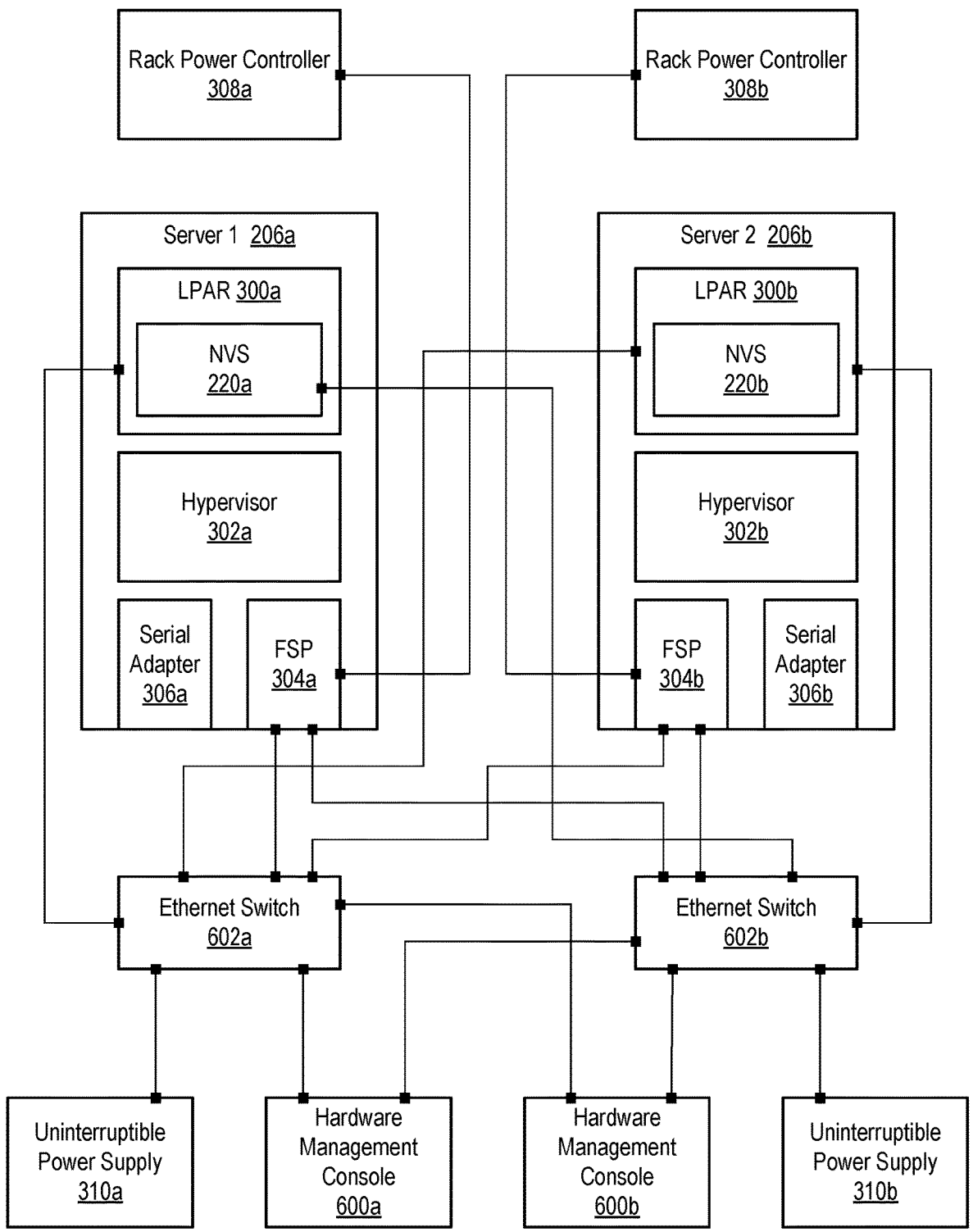
FIG. 6 is a high-level block diagram showing other components that may monitor the supply of power to a storage system such as that illustrated in FIG. 2.

Referring to FIG. 6, other methods and techniques for initiating a fire hose dump are possible and within the scope of the invention. For example, in certain embodiments, uninterruptible power supplies 310 may include ports, such as ethernet ports, to connect the uninterruptible power supplies 310 to network devices such as ethernet switches 602. Similarly, hardware management consoles 600 may be used to manage, monitor, and service the servers 206 on the storage system 110a. The hardware management consoles 600, like the uninterruptible power supplies 310, may include ports, such as ethernet ports, to connect the hardware management consoles 600 to the ethernet switches 602 to enable communication with the servers 206 and uninterruptible power supplies 310.

In certain embodiments, the uninterruptible power supplies 310 may be configured to generate alert messages, such as Simple Network Management Protocol (SNMP) traps, when events occur on the uninterruptible power supplies 310. For example, the uninterruptible power supplies 310 may generate SNMP traps when the uninterruptible power supplies 310 experience a power outage and go on battery. In such cases, the SNMP traps may be communicated to the respective hardware management consoles 600. For example, a first hardware management console 600a may receive an SNMP trap associated with a first uninterruptible power supply 310a, and a second hardware management console 600b may receive an SNMP trap associated with a second uninterruptible power supply 310b when the respective uninterruptible power supplies 310a, 310b experience a power outage and go on battery.

When a hardware management console 600 receives an SNMP trap from its respective uninterruptible power supply 310, the hardware management console 600 may process the SNMP trap and update an internal UPS code object to indicate that the uninterruptible power supply 310 is in the on-battery state. Similarly, the hardware management console 600 may communicate the on-battery status of its uninterruptible power supply 310 to the other hardware management console 600.

Figure 7:
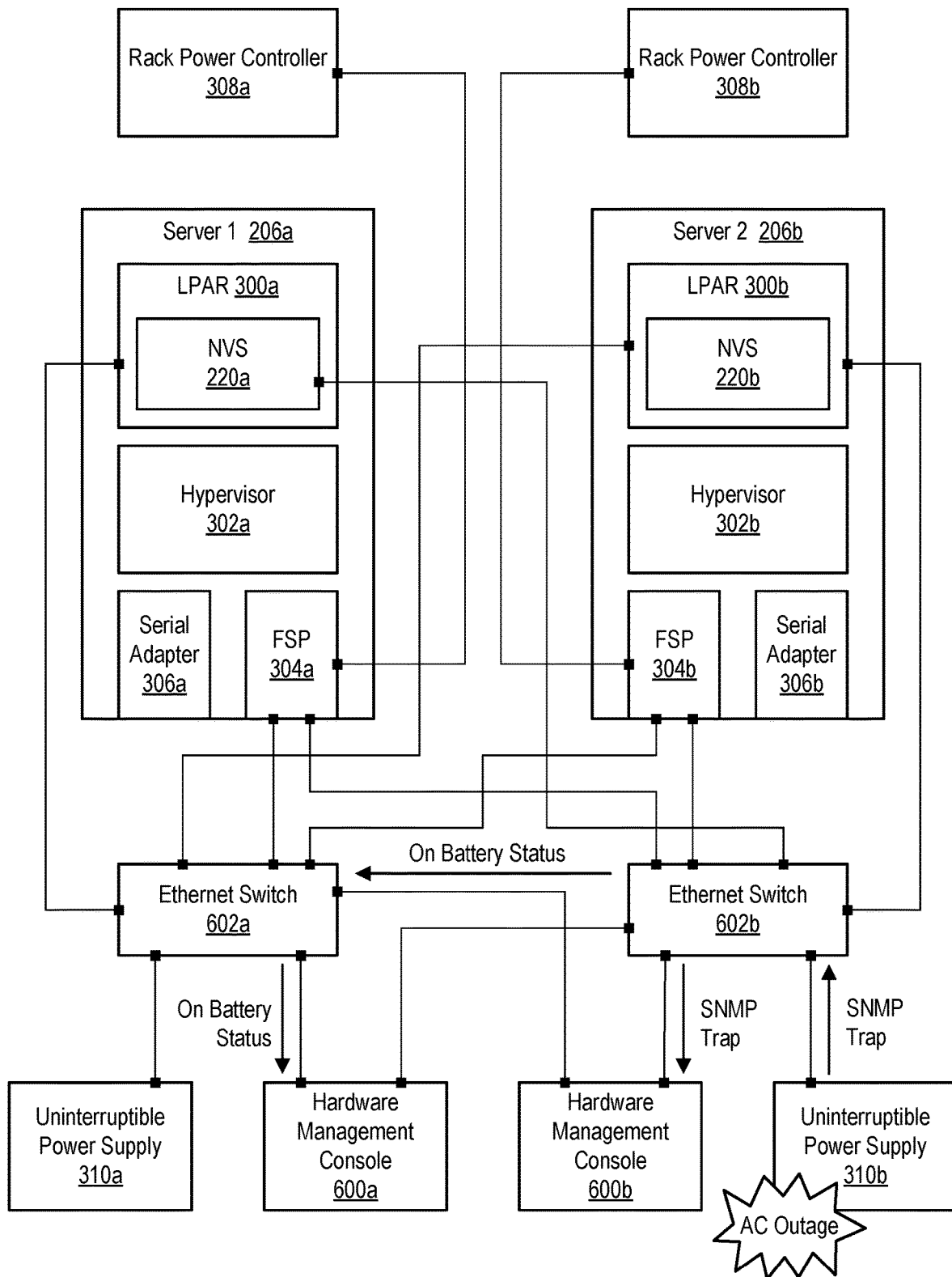
FIG. 7 is a high-level block diagram showing the system of FIG. 6 when a single uninterruptible power supply goes on battery.

For example, as shown in FIG. 7, when a second uninterruptible power supply 310b experiences a power outage and goes on battery, the second uninterruptible power supply 310b may generate an SNMP trap. This SNMP trap may be communicated to the second hardware management console 600b through the ethernet switch 602b. Upon receiving the SNMP trap, the second hardware management console 600b may update its UPS code object to indicate that its uninterruptible power supply 310b is on battery. The hardware management console 600b may then communicate this on-battery status to the other hardware management console 600a through the ethernet switch 602a. Upon receiving the on-battery status, the first hardware management console 600a may update is internal UPS code object to indicate that the second uninterruptible power supply 310b is on battery. If the first hardware management console 600a does not detect a corresponding power outage and on-battery status for its uninterruptible power supply 310a, the first hardware management console 600a may do nothing. That is, the first hardware management console 600a may not attempt to initiate a fire hose dump or other emergency measure on the first and second servers 206a, 206b.

Figure 8:
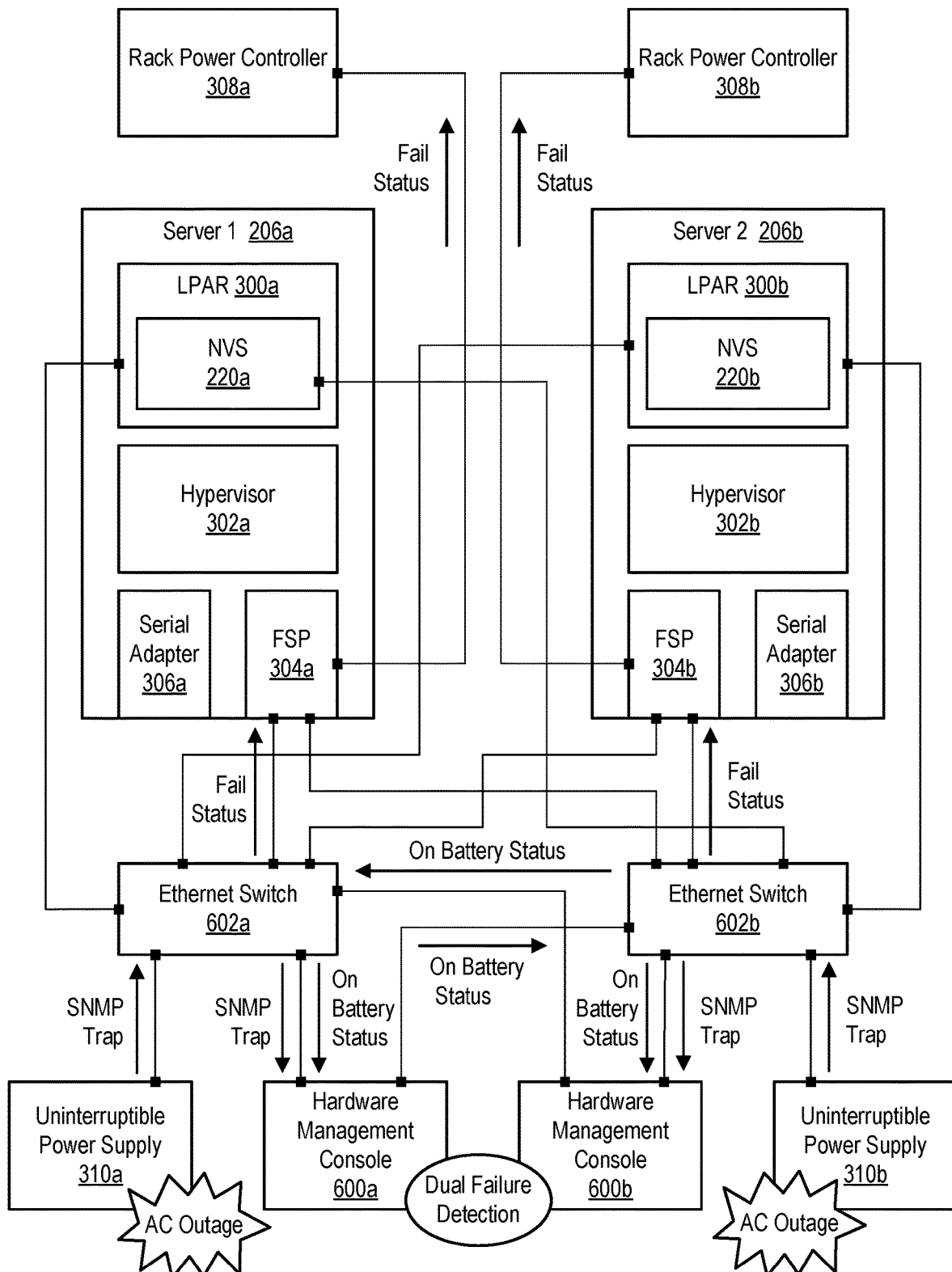
FIG. 8 is a high-level block diagram showing the system of FIG. 6 when both uninterruptible power supplies go on battery.

If, on the other hand, the first hardware management console 600a detects that its uninterruptible power supply 310a has also experienced a power outage and is on battery, as shown in FIG. 8, the first hardware management console 600a may update its internal UPS code object to indicate that the first uninterruptible power supply 310a is on battery. In such a case the first hardware management console 600a may know that both uninterruptible power supplies 310a, 310b are on battery. In such a scenario, the first hardware management console 600a may communicate failure status to both rack power controllers 308a, 308b (via, for example, the flexible service processor 304 previously discussed), indicating that the storage system 110a is now running on battery. The rack power controllers 308 may then know that both uninterruptible power supplies 310 are on battery and initiate fire hose dumps on both servers 206 in the manner previously described in association with FIGS. 3 through 5. Alternatively, the hardware management console 600a may directly initiate the fire hose dump on the servers 206 (via, for example, the flexible service processors 304) without requiring initiation by the rack power controllers 308.

Similarly, for redundancy purposes, the first hardware management console 600a may, upon detecting that its uninterruptible power supply 310a is on battery, send on-battery status to the second hardware management console 600b. The second hardware management console 600b, now knowing that both uninterruptible power supplies 310a, 310b are on battery, may also send failure status to both rack power controller 308a, 308b (or alternatively, directly to both servers 206), thereby initiating fire hose dumps on both servers 206 if they have not already been initiated. Thus, when both uninterruptible power supplies 310 experience a power outage and are on battery, both hardware management consoles 600a, 600b may detect on-battery status associated with both uninterruptible power supplies 310 and independently initiate fire hose dumps either directly or indirectly on both servers 206.

Figure 9:
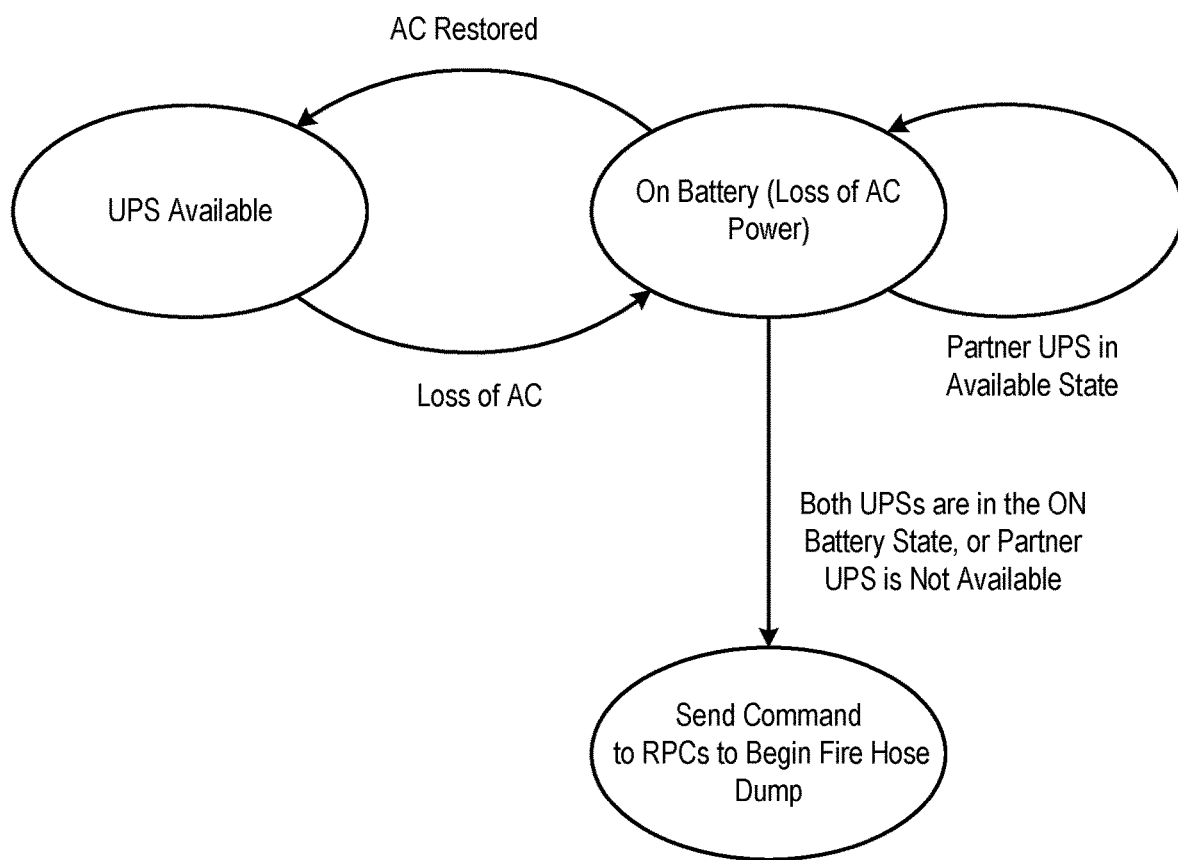
FIG. 9 is a state diagram showing various states of a UPS code object within a hardware management console.

FIG. 9 is a state diagram showing various states of a UPS code object within a hardware management console 600. As shown, when an uninterruptible power supply 310 associated with a hardware management console 600 is available and not on battery, the UPS code object associated with the uninterruptible power supply 310 in the hardware management console 600 is set to "UPS Available." When the hardware management console 600 receives an SNMP trap indicating that the uninterruptible power supply 310 has experienced a power outage and is on battery, the UPS code object may be set to "On Battery." The hardware management console 600a may remain in this state as long as the uninterruptible power supply 310 of the partner hardware management console 600 is available and not on battery. While the UPS code object is in the "On Battery" state, if the hardware management console 600 detects that the uninterruptible power supply 310 of its partner hardware management console 600 is also on battery or unavailable, the hardware management console 600 may instruct the rack power controllers 308 to initiate a fire hose dump.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for protecting data in a storage system, the method comprising:
    detecting, by a first hardware management console, first battery-on status associated with a first uninterruptible power supply, the first battery-on status indicating that the first uninterruptible power supply has experienced an external power outage and is relying on battery power;
    detecting, by a second hardware management console, second battery-on status associated with a second uninterruptible power supply, the second battery-on status indicating that the second uninterruptible power supply has experienced an external power outage and is relying on battery power, wherein the second uninterruptible power supply and the first uninterruptible power supply are separate hardware components utilizing separate backup batteries;
    communicating, from the first hardware management console to the second hardware management console, the first battery-on status; and
    triggering, by the second hardware management console, a dump of modified data from memory upon detecting that both the first battery-on status and the second battery-on status are asserted simultaneously, while declining to trigger the dump of modified data in the event only one or neither of the first battery-on status and the second battery-on status are asserted, regardless of any amount of charge remaining in either of the first uninterruptible power supply and the second uninterruptible power supply.

2. The method of claim 1, wherein detecting the first battery-on status comprises receiving, by the first hardware management console, a first alert message from the first uninterruptible power supply indicating the first battery-on status.

3. The method of claim 2, wherein detecting the second battery-on status comprises receiving, by the second hardware management console, a second alert message from the second uninterruptible power supply indicating the second battery-on status.

4. The method of claim 3, wherein the first and second alert messages are Simple Network Management Protocol (SNMP) traps.

5. The method of claim 1, wherein triggering the dump comprises communicating the first battery-on status and the second battery-on status to a rack power controller which initiates the dump.

6. The method of claim 1, wherein triggering the dump comprises directly initiating the dump on multiple storage servers of an enterprise storage system.

7. The method of claim 1, wherein triggering the dump comprises copying the modified data from the memory to persistent storage.

8. A computer program product for protecting data in a storage system, the computer program product comprising a computer-readable storage medium having computer-usable program code embodied therein, the computer-usable program code configured to perform the following when executed by at least one processor:
    detect, by a first hardware management console, first battery-on status associated with a first uninterruptible power supply, the first battery-on status indicating that the first uninterruptible power supply has experienced an external power outage and is relying on battery power;
    detect, by a second hardware management console, second battery-on status associated with a second uninterruptible power supply, the second battery-on status indicating that the second uninterruptible power supply has experienced an external power outage and is relying on battery power, wherein the second uninterruptible power supply and the first uninterruptible power supply are separate hardware components utilizing separate backup batteries;
    communicate, from the first hardware management console to the second hardware management console, the first battery-on status; and
    trigger, by the second hardware management console, a dump of modified data from memory upon detecting that both the first battery-on status and the second battery-on status are asserted simultaneously, while declining to trigger the dump of modified data in the event only one or neither of the first battery-on status and the second battery-on status are asserted, regardless of any amount of charge remaining in either of the first uninterruptible power supply and the second uninterruptible power supply.

9. The computer program product of claim 8, wherein detecting the first battery-on status comprises receiving, by the first hardware management console, a first alert message from the first uninterruptible power supply indicating the first battery-on status.

10. The computer program product of claim 9, wherein detecting the second battery-on status comprises receiving, by the second hardware management console, a second alert message from the second uninterruptible power supply indicating the second battery-on status.

11. The computer program product of claim 10, wherein the first and second alert messages are Simple Network Management Protocol (SNMP) traps.

12. The computer program product of claim 8, wherein triggering the dump comprises communicating the first battery-on status and the second battery-on status to a rack power controller which initiates the dump.

13. The computer program product of claim 8, wherein triggering the dump comprises directly initiating the dump on multiple storage servers of an enterprise storage system.

14. The computer program product of claim 13, wherein triggering the dump comprises copying the modified data from the memory to persistent storage.

15. A system for protecting data in a storage system, the system comprising:
    at least one processor;
    at least one memory device operably coupled to the at least one processor and storing instructions for execution on the at least one processor, the instructions causing the at least one processor to:
        detect, by a first hardware management console, first battery-on status associated with a first uninterruptible power supply, the first battery-on status indicating that the first uninterruptible power supply has experienced an external power outage and is relying on battery power;
        detect, by a second hardware management console, second battery-on status associated with a second uninterruptible power supply, the second battery-on status indicating that the second uninterruptible power supply has experienced an external power outage and is relying on battery power, wherein the second uninterruptible power supply and the first uninterruptible power supply are separate hardware components utilizing separate backup batteries;
        communicate, from the first hardware management console to the second hardware management console, the first battery-on status; and
        trigger, by the second hardware management console, a dump of modified data from memory upon detecting that both the first battery-on status and the second battery-on status are asserted simultaneously, while declining to trigger the dump of modified data in the event only one or neither of the first battery-on status and the second battery-on status are asserted, regardless of any amount of charge remaining in either of the first uninterruptible power supply and the second uninterruptible power supply.

16. The system of claim 15, wherein detecting the first battery-on status comprises receiving, by the first hardware management console, a first alert message from the first uninterruptible power supply indicating the first battery-on status.

17. The system of claim 16, wherein detecting the second battery-on status comprises receiving, by the second hardware management console, a second alert message from the second uninterruptible power supply indicating the second battery-on status.

18. The system of claim 17, wherein the first and second alert messages are Simple Network Management Protocol (SNMP) traps.

19. The system of claim 15, wherein triggering the dump comprises communicating the first battery-on status and the second battery-on status to a rack power controller which initiates the dump.

20. The system of claim 15, wherein triggering the dump comprises directly initiating the dump on multiple storage servers of an enterprise storage system.

* * * * *